United States Patent [19]

Peters

[11] 4,333,605
[45] Jun. 8, 1982

[54] VARIABLE INPUT-RESISTANCE POWER SUPPLY CIRCUIT

[75] Inventor: Kenneth R. Peters, Billerica, Mass.

[73] Assignee: American Stabilis, Inc., Lewiston, Me.

[21] Appl. No.: 255,177

[22] Filed: Apr. 17, 1981

[51] Int. Cl.³ .................. H01H 9/00; G05D 15/00
[52] U.S. Cl. .................. 236/78 R; 236/46 R; 361/154
[58] Field of Search .......... 361/154, 161; 236/46 R, 236/78 R; 165/12, 26

[56] References Cited

U.S. PATENT DOCUMENTS

| | | | |
|---|---|---|---|
| 4,162,036 | 7/1979 | Balduzzi et al. | 236/47 |
| 4,167,786 | 9/1979 | Miller et al. | 364/493 |
| 4,191,328 | 3/1980 | Isaacs et al. | 236/46 R |
| 4,215,815 | 8/1980 | Krump | 236/46 R |
| 4,235,368 | 11/1980 | Neel | 236/94 |
| 4,249,696 | 2/1981 | Donnelly et al. | 236/46 R |

*Primary Examiner*—William E. Wayner
*Attorney, Agent, or Firm*—Finnegan, Henderson, Farabow, Garrett and Dunner

[57] ABSTRACT

A power supply circuit for a temperature control system is switchable between a low input impedance mode and a high input impedance mode, so that a temperature control system having this power supply can directly replace a bimetallic switch and the power supply will look to the rest of the system like the replaced bimetallic switch.

10 Claims, 4 Drawing Figures

FIG. IA.
(PRIOR ART)
FIG. IB.
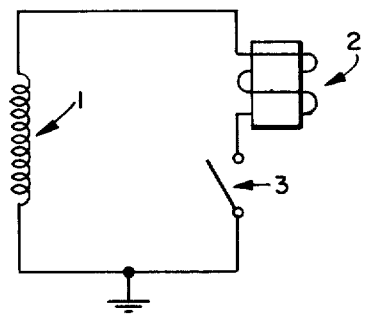
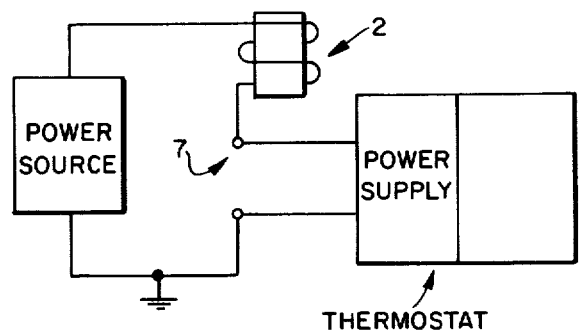
FIG. 2.
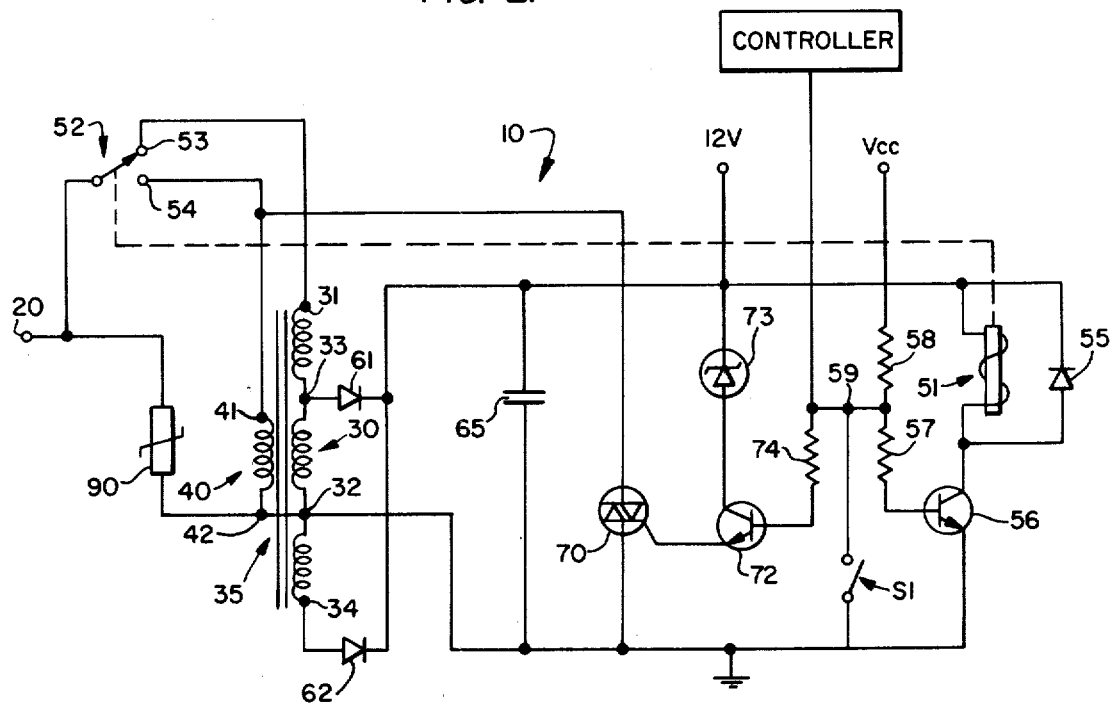
FIG. 3.
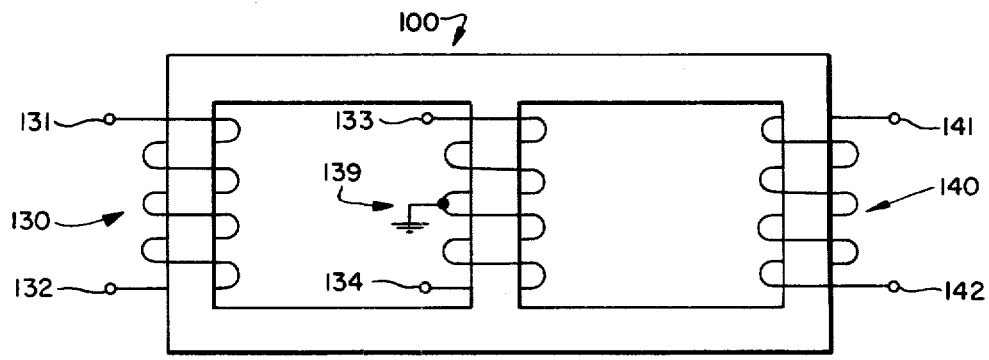

VARIABLE INPUT-RESISTANCE POWER SUPPLY CIRCUIT

BACKGROUND OF THE INVENTION

This invention relates to the field of variable input-resistance power supply circuits, and in particular, to the use of such power supply circuits in temperature control systems.

The most basic control circuit for furnaces and air conditioners is shown in FIG. 1A. A secondary 1 of a transformer provides a source of power. It is connected to the coil 2 of an activation relay and to a bimetallic switch 3. The relay and the transformer are usually located near the furnaces or air conditioners and the bimetallic switch 3 is part of a thermostat located in the area in which temperature control is desired.

When the temperature reaches a preset value in the system in FIG. 1A, the bimetallic switch closes causing current to flow through the coil of the activation relay. That coil current in turn causes the relay contacts to turn on or off the heating or air conditioning system to which the contacts are connected.

When the temperature changes from that preset value in the proper direction, the bimetallic switch opens. This stops the current flow through coil 2 and causes the heating or air conditioning system to which the relay contacts are connected to change state.

Recently, there have appeared on the market sophisticated thermostats which provide a wide range of capabilities for temperature control. Many of these thermostats allow the person using them to program temperature settings for an entire day. Unfortunately, many of these thermostats are incompatible with existing temperature control systems.

Existing temperature control systems commonly contain circuits similar to the one in FIG. 1A. One way of connecting the new thermostats to the existing circuits is to replace the bimetallic switch in FIG. 1A by a relay controlled by a sophisticated thermostat. There remains, however, the question of how to power that thermostat and these new thermostats typically have a large number of logic elements and may even contain a microprocessor.

One new thermostat uses a control relay in place of a bimetallic switch. The supply voltage for the thermostat is the voltage across the control relay when that relay is open. When the relay closes to activate the system, the thermostat switches to battery power.

The use of a battery, however, makes a thermostat unnecessarily large and expensive. Another problem is that most batteries cannot power a thermostat constructed from the most common, inexpensive logic elements. A thermostat using battery power may have to use low-power components, typically of the CMOS variety, which are more expensive than bipolar or NMOS components.

Another alternative is to power the thermostat from a power source entirely separate from the heating or air conditioning units. This alternative has an added cost of connecting external power. A more troublesome problem with the use of external power occurs if the external power to the thermostat fails, for example because of a blown fuse. Power will still be supplied to essentially uncontrolled heating and cooling systems.

SUMMARY OF THE INVENTION

The present invention overcomes the problems and disadvantages of the prior art by providing a power supply for a thermostat which replaces the bimetallic strip in FIG. 1A. As FIG. 1B shows, the power supply of the temperature control system connects to the terminals that had formally been connected to the bimetallic strip.

In order to operate with systems like the one in FIG. 1A, the power supply circuit of this invention looks like a bimetallic switch by approximating both a short circuit and an open circuit. The power supply of this invention accomplishes this by having high and low input impedance modes which energize and deenergize activation relay 2.

The power supply circuit also receives its input power from these terminals and provides a sufficiently large voltage signal to the thermostat both when its input resistance is high (i.e., an open bimetallic switch) and when its resistance is low (i.e., a closed bimetallic switch).

It is an object of this invention to provide a power supply circuit which is compatible with a wide variety of existing temperature control systems.

It is also an object of this invention to provide such a power supply circuit which can deliver sufficient power to drive a digital thermostat constructed of standard NMOS logic elements.

Additional objects and advantages of the invention will be set forth in part in the description which follows and in part will be obvious from the description or may be learned by the practice of the invention. The objects and advantages of the invention may be realized and obtained by means of the instrumentalities and combinations particularly pointed out in the appended claims.

To achieve the objects and in accordance with the purpose of the invention, as embodied and as broadly described herein, in a system including an input voltage signal, the power supply circuit of this invention comprises first power transfer means having input terminals and output terminals; second power transfer means having input terminals separated by an impedance substantially smaller than the impedance between said input terminals of said first power transfer means, said second power transfer means sharing said output terminals of said first means such that the rms voltage at the output terminals remains larger than a minimum voltage level whether the input voltage signal is connected to the input terminals of the first power transfer means or of the second power transfer means; and switching means for connecting the input voltage signal to the input terminals of the first power transfer means if the system is in a first state requiring a large voltage across the power supply circuit, and for connecting the input voltage signals to the input terminals of the second means if the system is in a second state requiring a small voltage across the power supply circuit.

More specifically, the power supply circuit of this invention comprises an transformer having a core, input terminals, and output terminals; a primary winding electromagnetically coupled to the core of the transformer such that the rms voltage at the output terminals remains larger than a minimum voltage level whether the output voltage signal is connected to the input terminals of the first power transfer means or of the second power transfer means, the primary winding having input terminals separated by an impedance which is substantially smaller than the impedance between the input terminals of the transformer; and switching means for connecting the input voltage signal to the input terminals of the transformer if the temperature control system is in a first state requiring a large voltage across the power supply circuit, and for connecting the input voltage signal to the input terminals of the primary windings if the temperature control system is in a second state requiring a small voltage across the power supply circuit.

The accompanying drawings, which are incorporated in and which constitute a part of the specification, illustrate one embodiment of the invention and, together with the description, serve to explain the principles of the invention.

BRIEF DESCRIPTION OF THE DRAWINGS

FIG. 1A is a circuit showing the conventional temperature control system;

FIG. 1B is a block diagram showing the connection of the temperature control system of the present invention;

FIG. 2 is a circuit diagram of the power supply of this invention; and

FIG. 3 is a diagram of a three winding transformer which can be used in the circuit in FIG. 2.

DESCRIPTION OF THE PREFERRED EMBODIMENT

Reference will now be made in detail to the present preferred embodiment of the invention, an example of which is illustrated in the accompanying drawings.

The preferred embodiment of the power supply circuit for a temperature control system is shown in FIG. 2 and is represented generally by the numeral 10. The temperature control system has an input voltage signal which appears at terminal 20. If used with the circuit in FIG. 1B, terminal 20 would connect to terminal 7.

This power supply circuit includes first power transfer means having input terminals and output terminals. As herein embodied, the first power transfer means includes autotransformer 30.

Autotransformer 30 has two input terminals 31 and 32 and two output terminals 33 and 34. The core of the transformer is represented by numeral 35.

The transformer has 660 turns between terminals 31 and 33, 660 turns between terminals 33 and 32, and 660 turns between terminals 32 and 34. Accordingly, between input terminals 31 and 32 there are 1,320 turns and between output terminals 33 and 34 there are 1,320 turns, so the magnitude of an AC signal applied at the input terminals is substantially equal to the magnitude of the corresponding signal at the output terminals. In the preferred embodiment, the signal at the output terminals is about 24 Vrms.

The impedance between input terminals 31 and 32 is 1.6K ohms in the preferred embodiment (the DC resistance is 60 ohms). This large impedance approximates an open bimetallic switch by creating a large voltage drop across the power supply input terminals and a small current flow into the supply. When terminal 20 is connected to transformer 30, the impedance between the input terminals of transformer 30 reduces the current through the activation relay sufficiently to deenergize that relay.

This deenergization current must be very small because once energized, not very much holding current is required to keep the relay energized. The deenergization current into the transformer input terminals must be even lower than this holding current for the activation relays in each of the different systems to which this power supply may be connected. In the preferred embodiment, the value of the current through the activation relay coil and into the transformer is about 15 ma.

The power supply circuit of this invention also includes second power transfer means having input terminals separated by an impedance substantially smaller than the impedance between the input terminals of the first power transfer means, the second power transfer means sharing the output terminals of the first means such that the rms voltage at the output terminals remains greater than a minimum voltage level whether the input voltage signal is connected to the input terminals of the first power transfer means or of the second power transfer means.

In the preferred embodiment, the second power transfer means includes primary winding 40. Primary winding 40 has input terminals 41 and 42 separated by an impedance of about 2 ohms. The primary winding input terminals are electromagnetically coupled to transformer 30 through core 35, so an AC signal appearing on the input terminals of primary winding 40 will be coupled to the output terminals 33 and 34.

There are approximately 160 windings between the input terminals of the primary winding 40. An AC signal at the primary winding input terminals will appear approximately 1320/160 times as large at output terminals 33 and 34. Since only a small voltage signal will be present across the primary winding input terminals when terminal 41 is connected to terminal 20, the large winding ratio maintains the voltage at output terminals 33 and 34 greater than the minimum voltage necessary to power the thermostat.

When primary winding terminal 41 is connected to input terminal 20, the power supply circuit approximates a closed bimetallic switch. The power supply input impedance is small enough in this mode to cause the current through the activation relay coil to energize that relay.

The size of the input impedance is particularly a problem in certain systems running off 15 volts rather than 24 volts. The voltage drop of a "closed" switch in a 15 volt system must be even less than that of a "closed" switch in a 24 volt system to cause sufficient energization current to flow through the thermal activation relay. For the present invention to work in both types of systems, the input impedance of the power supply circuit must be especially small to minimize the voltage drop across the input to the power supply circuit. A smaller voltage drop increases the current flowing through the activation relay coil. Preferably, this voltage drop is less than three volts.

The transformer 30 and primary winding 40 in FIG. 2 could be replaced by a three winding transformer 100 seen in FIG. 3. With the transformer in FIG. 3, either input winding 130 or input winding 140 would be connected to terminal 20 in FIG. 2.

Input winding 130, having terminals 131 and 132, corresponds to autotransformer 30 in FIG. 2. The impedance between input terminals 131 and 132 is large, approximately 1.6 Kohm. The number of turns on input winding 130 is the same as the number of turns on the ground-center-tapped output winding 139, so an AC voltage applied to input terminals 131 and 132 would have substantially the same magnitude as the resulting voltage at output terminals 133 and 134.

The second input winding 140 corresponds to primary winding 40 in FIG. 2. The input impedance of winding 140 is about 2 ohms and the ratio of output winding 139's turns to input winding 140's turns is sufficiently large to ensure that when input terminals 141 and 142 are connected to terminal 20, the signal at output terminals 133 and 134 is larger than the minimum voltage level as it is when the output signal when winding 130 is connected to terminal 20.

The power supply circuit of the present invention further includes switching means for connecting the input voltage signal to the input terminals of the first means if the temperature control system is in a first state requiring a large voltage across the power supply circuit, and for connecting the input voltage signal to the input terminals of the second means if the temperature control circuit is in a second state requiring a small voltage across the power supply circuit. As herein embodied, the switching means includes relay coil 51, relay throw 52, and contacts 53 and 54.

The relay coil 51 controls the position of relay throw 52 and determines whether throw 52 connects terminal 20 to terminal 31 of transformer 30 or to terminal 41 of primary windings 40. If terminal 20 connects to contact 53, and thus to transformer terminal 30, very little current will be drawn through the power supply circuit. The voltage across the transformer input terminals will be large, essentially the same as the voltage at the secondary winding in FIG. 1B.

Conversely, when the throw connects terminal 20 to contact 54 and to primary winding terminal 41, the voltage across the power supply circuit will be small because the input impedance of the power supply will be low.

Relay coil 51 is energized by switching transistor 56. One terminal of coil 51 is connected to the raw voltage of about 12 volts, and the other terminal of coil 51 connects to the collector of transistor 56. The emitter of transistor 56 is at a ground.

The base of transistor 56 is connected through resistor 57 to node 59 whose level is set by a controller. Node 59 is also connected through resistor 58 to a conditioned input voltage Vcc.

In the preferred embodiment, the controller puts the temperature control system into a quiescent state, i.e., a state where the activation relay in FIG. 1B is not energized, by bringing the potential of node 59 to ground. This forces transistor 56 into a cut-off region thereby deenergizing relay coil 51. When coil 51 is not energized, relay throw 52 connects autotransformer 30 to input terminal 20. The large input impedance of transformer 30 in the circuit in FIG. 1B deenergizes the activation relay 1.

When, in the preferred embodiment, the controller switches the temperature control system into an activation state, a state in which the activation relay is energized, the controller brings node 59 to a sufficiently high potential to saturate transistor 56. This causes an energizing current to flow through relay coil 51 which then connects throw 52 to contact 54 thereby connecting primary winding 40 to input terminal 20. The small input impedance of primary winding 40 in the circuit of FIG. 1B causes an energizing current to flow through relay coil 2.

A protection diode 55 across relay coil 51 discharges the magnetic field of winding 51 and thus avoids transient spikes when the current through that coil is cut off.

MOV 90 lies between input terminal 20 and ground to suppress voltage transients on the incoming power lines. Without this transient suppresser, the controller could be reset when switching from the quiescent state to the activation state.

The power supply circuit further includes rectifying means connected to the output terminals of the transformer for transforming the voltage at the output terminals of transformer 30 into a substantially DC voltage. In the preferred embodiment, the rectifying means includes diodes 61 and 62. The anodes of these diodes each connects to a different output terminal of transformer 30, and the cathodes of diodes 61 and 62 connect together. The diodes perform a full-wave rectification of the signal at the output terminals.

Capacitor 65 lies between the cathodes of diodes 61 and 62 and ground. Capacitor 65 averages out the voltage at the cathodes of diodes 61 and 62 to create a substantially DC voltage called the raw voltage of the power supply circuit.

The power supply circuit of this invention also includes sensing means for ensuring that the substantially DC voltage does not exceed a predetermined value when the primary winding is connected to the next voltage signal. In the preferred embodiment in FIG. 2, the sensing means includes zener diode 73, switching transistor 72, and triac 70.

The output terminals of triac 70 bridge the input terminals of primary winding 40. Triac 70 is controlled by transistor 72 by having the triac's gate connected to the emitter of transistor 72.

The collector of transistor 72 connects to the anode of zener diode 73, and the zener diode's cathode is connected to the raw voltage of the power supply circuit. The base of transistor 72 is connected through resistor 74 to node 59.

If node 59 is at a ground potential, indicating that the controller wants a quiescent state, then transistor 72 goes into its cut-off region and the temperature sensing circuit is inoperative.

When node 59 is at a high enough potential to turn on transistor 72, a condition which occurs when the controller wants the activation state, the sensing means is rendered operative.

If the raw voltage level rises too high, for example, 12½ volts in the preferred embodiment, zener diode 73 beings to conduct and current flows through transistor 72 and into the gate of triac 70. This gate current turns on triac 70 causing it to short the input terminals to primary winding 40 for the remainder of the current half cycle of the 60 cycle input signal.

Shorting the primary winding input terminals has two effects. First, the power supply circuit no longer receives input power from the circuit in FIG. 1B, so the raw voltage level begins to drop. Triac 70 switches off every half cycle (when the current through the triac is zero) which removes the clamp from the primary winding input terminals.

Second, intermittent shorting out of primary winding 40 also reduces the effective impedance of the power supply circuit when the temperature control system is in an activation mode. Reducing the input impedance makes the power supply circuit look even more like a closed bimetallic switch.

S1 in FIG. 2 is the system on/off switch. When closed, S1 holds node 59 to ground which turns transistors 72 and 56 off and disables relay coil 51 and triac 70.

When closed, S1 thus holds the temperature control system in a quiescent state.

The following table contains the preferred component types for the circuit in FIG. 2:

| | Component |
|---|---|
| Resistors | |
| 57 | 27K ohm |
| 58 | 10K ohm |
| 74 | 10K ohm |
| 90 | V47MA2B |
| Diodes | |
| 55 | 1N4148 |
| 61 | 1N4004 |
| 62 | 1N4004 |
| 73 | 1N758 (10V) |
| Transistors | |
| 56 | 2N5172 |
| 72 | 2N5172 |
| Capacitor | |
| 65 | 100 microfarad |

It will be apparent to those skilled in the art that various modifications and variations can be made in the power supply circuit of this invention without departing from the scope or spirit of the invention. It is intended that the present invention cover the modifications and variations of this invention provided that they come within the scope of the appended claims and their equivalents.

What is claimed is:

1. In a system including an input voltage signal, a power supply circuit comprising:
    first power transfer means having input terminals and output terminals;
    second power transfer means having input terminals separated by an impedance substantially smaller than the impedance between said input terminals of said first power transfer means, said second power transfer means sharing said output terminals of said first power transfer means such that the rms voltage at said output terminals remains larger than a minimum voltage level both when said input voltage signal is connected to said input terminals of said first power transfer means and to said input terminals of said second power transfer means;
    voltage limiting means connected to said second power transfer means for monitoring said rms voltage at said output terminals and for ensuring that the rms voltage at said output terminals does not exceed a predetermined level when said input voltage signal is connected to said input terminals of said second power transfer means; and
    switching means for connecting said input voltage signal to said input terminals of said first means if said system is in a first state requiring a large voltage across said power supply circuit, and for connecting said input voltage signal to said input terminals of said second means if said system is in a second state requiring a small voltage across said power supply circuit.

2. In a temperature control system including an input voltage signal, a power supply circuit comprising:
    a transformer having a core, input terminals, and output terminals;
    a primary winding electromagnetically coupled to said core of said transformer such that the rms voltage at said output terminals remains larger than a minimum voltage level whether said input voltage signal is connected to said input terminals of said transformer or to said primary winding, said primary winding having input terminals separated by an impedance which is substantially smaller than the impedance between said input terminals of said transformer;
    voltage limiting means connected to said primary winding for monitoring said rms voltage at said output winding and for ensuring that said rms voltage at said output terminals does not exceed a predetermined level when said input voltage signal is connected to said input terminals of said primary winding; and
    switching means for connecting said input voltage signal to said input terminals of said transformer if said temperature control system is in a first state requiring a large voltage across said power supply circuit, and for connecting said input voltage signal to said input terminals of said primary winding if said temperature control system is in a second state requiring a small voltage across said power supply circuit.

3. The power supply circuit in claim 2 further including rectifying means connected to said output terminals of said transformer for transforming said voltage at said output terminals into a substantially D.C. voltage.

4. The power supply circuit in claim 3 wherein said voltage limiting means includes sensing means for ensuring that said substantially D.C. voltage does not exceed a predetermined value when said primary winding is connected to said input voltage signal.

5. In a temperature control system capable of being in either an activation state wherein said system is providing active temperature control or in a quiescent state wherein said system is not providing active temperature control, said temperature control system containing a power source connected to a first terminal of a thermal activation relay, a thermostat power supply circuit connected to a second terminal of said thermal activation relay, said thermostat power supply circuit comprising:
    an transformer having a core, first and second input terminals, and two output terminals, wherein the impedance between said transformer input terminals is sufficiently large such that if said transformer input impedance were connected between said second terminal of said thermal activation relay and ground, the transformer input current would deactivate said thermal activation relay;
    a primary winding having first and second input terminals and being electromagnetically coupled to said core of said transformer, the ratio of the transformer windings to the primary windings being such the rms voltage at said output terminals remains larger than a minimum voltage level whether said second thermal activation relay terminal is connected to said second primary winding input terminal or to said second transformer input terminal, wherein said first primary winding input terminal is connected to said first transformer input terminals and to ground, and wherein the impedance between said input terminals is sufficiently small such that if said primary winding input resistance were connected between said second terminal of said thermal activation relay and ground, the primary winding input current would activate said thermal activation relay;

a relay for either connecting said second terminal of said thermal activation relay to said second input terminal of said transformer to put said temperature control system into said quiescent state or for connecting said second thermal activation relay terminal to said second input terminal of said primary winding to put said temperature control system into said activation state, said input voltage signal having a smaller magnitude when said temperature control system is in said activation state than when said system is in said quiescent state;

a relay controller for determining the state of said relay;

two diodes, each of whose anodes is connected to a different one of said output terminals of said transformer, and whose cathodes are connected together, said diodes rectifying said voltage at said output terminals of said transformer;

a capacitor connected between said cathodes of said diodes and ground to transform said rectified voltage into a substantially D.C. voltage;

a triac whose output terminals are connected across said input terminals of said primary transformer to short out said terminals if said substantially D.C. voltage becomes greater than a predetermined level;

a transistor to activate said triac, the base of said transistor being connected to said relay controller and the emitter of said transistor being connected to the gate of said triac; and a zener diode whose cathode is connected to the collector of said transistor and whose anode is connected to said substantially D.C. voltage, for causing said transistor to conduct when said substantially D.C. voltage becomes greater than said predetermined level, said conducting transistor activating said triac to short out said input terminals of said primary winding.

6. A power supply circuit for a heating system comprising:

a transformer having a core, two input terminals, and two output terminals;

a primary winding having two input terminals separated by an impedance smaller than the impedance between said transformer input terminals, said primary winding being electromagnetically coupled to said core of said transformer;

switching means for connecting an input voltage signal to said input terminals of said primary winding for said heating system to supply heat and for connecting said input voltage signal to said input terminals of said transformer for said heating system to stop supplying heat; and voltage limiting means connected to said primary winding for monitoring said rms voltage at said output terminals and for ensuring that said rms voltage at said output terminals does not exceed a predetermined level when said input voltage signal is connected to said input terminals of said primary winding.

7. A power supply circuit for an air conditioning system comprising:

a transformer having a core, two input terminals and two output terminals;

a primary winding having two input terminals separated by an impedance smaller than the impedance between said transformer input terminals, said primary winding being electromagnetically coupled to said core of said transformer;

switching means for connecting an input voltage signal to said input terminals of said primary winding for said air conditioning system to supply cooling and for connecting said input voltage signal to said input terminals of said transformer for said air conditioning system to stop supplying cooling; and voltage limiting means connected to said primary winding for monitoring the voltage at said output terminals and for ensuring that said rms voltage at said output terminals does not exceed a predetermined level when said input voltage signal is connected to said input terminals of said primary winding, said voltage limiting means thereby acting to reduce the impedance of said primary winding.

8. The power supply circuit in any one of claims 2, 3, 4, or 7, wherein said voltage limiting means includes a semiconductor switch across the input terminals of said primary winding.

9. In a temperature control system including an input voltage signal, a power supply circuit comprising:

a three winding transformer having an output winding, a first input winding, and a second input winding, said second input winding having an input impedance substantially smaller than the input impedance of said first input winding, said input windings being arranged such that the rms voltage at said output winding remains larger than a minimum voltage level whether said input voltage signal is connected to said first input winding or to said second input winding; and switching means for connecting said input voltage signal to said first input winding if said temperature control system is in a first state requiring a large voltage across said power supply circuit, and for connecting said input voltage signal to said second input winding if said temperature control system is in said second state requiring a small voltage across said power supply circuit.

10. The temperature control system of claim 9 further including a voltage limiting means connected to said second input winding for monitoring said rms voltage at said output winding and for ensuring that said rms voltage at said output winding does not exceed a predetermined level when said input voltage signal is connected to said second winding.

* * * * *